United States Patent Office 3,780,097
Patented Dec. 18, 1973

3,780,097
PURIFICATION OF ALKALI METAL SALTS OF AROMATIC CARBOXYLIC ACIDS
Richard C. Doss and Donald G. Kuper, Bartlesville, Okla., assignors to Phillips Petroleum Company
No Drawing. Filed Jan. 3, 1972, Ser. No. 215,177
Int. Cl. C07c 51/48, 51/42
U.S. Cl. 260—525    10 Claims

ABSTRACT OF THE DISCLOSURE

Water insoluble impurities are separated from an aqueous mixture of an alkali metal salt of an aromatic carboxylic acid containing such impurities in suspension by contacting the aforesaid mixture with a cationic acrylamide copolymer, e.g. a quaternary salt of a vinylpyridine/acrylamide copolymer. Filtration and settling time rates are significantly improved by the use of said cationic acrylamide copolymers.

---

This invention relates to purification of alkali metal salts of aromatic carboxylic acids. Another aspect of this invention relates to purification of alkali metal salts of aromatic carboxylic acids by contacting aqueous mixtures of said alkali metal salts with a cationic acrylamide copolymer.

Various methods of producing alkali metal salts of aromatic carboxylic acids, e.g. terephthalic acid from aromatic carboxylic acids, are well known in the art. For example, in the preparation of alkali metal salts of terephthalic acid, in general, the methods comprise heating alkali metal salts of aromatic monocarboxylic or dicarboxylic acids other than terephthalic acid, in a substantially oxygen-free inert atmosphere and in the presence of a suitable metal catalyst, until a substantial portion of the starting material has been transformed into the desired alkali meal terephthalate. Thereafter, the reaction product mixture is dissolved in water, and the metal catalyst and any other water insoluble matter are separated from the alkali metal trephthalate by filtration. Essentially pure terephthalic acid is then precipitated by acidification of the aqueous soluion with a mineral acid. An integral and significant part of the cost of producing essentially pure terephthalic acid is the cost of separation of water insoluble matter from alkali metal salts of terephthalic acid. Accordingly, new and improved methods of separating alkali metal salts of terephthalic acid from water insoluble impurities, particularly metal catalysts and/or insoluble carbonaceous substances, are of continuing economic interest to the chemical industry.

It is an object of this invention to provide a method of separating water insoluble impurities from aqueous solutions comprising substantial quantities of alkali metal salts of aromatic carboxylic acids. Another object is to improve the rate at which the separation of the impurities from alkali metal salt of aromatic mono and polycarboxylic acids can be effectively carried out. Still another object of this invention is to improve the efficiency of separation of water insoluble material from aqueous mixtures containing substantial amounts of alkali metal salts of aromatic polycarboxylic acids, in particular terephthalic acid, by filtration, decantation, centrifugation, and/or other suitable means. Other objects of the invention will be apparent from the written description and the appended claims.

In accordance with this invention it has been found that cationic acrylamide copolymers promote the efficient separation of water insoluble impurities from aqueous mixtures comprising alkali metal salts of aromatic carboxylic acids. It has also been found that the rate at which water insoluble impurities are separated from alkali metal salts of aromatic carboxylic acids is significantly improved when said salts are contacted with a cationic acrylamide copolymer.

Among the cationic acrylamide copolymers that are useful in accordance with this invention are unmodified and modified quaternary salts of vinylpyridine/acrylamide copolymers that contain recurring units that can be represented by the following formulas:

(I)

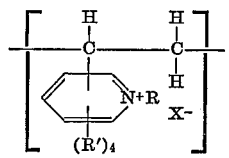

wherein each unit R independently represents the same or a different alkyl group, preferably having from 1 to 4 carbon atoms per alkyl group, each unit R' independently is selected from hydrogen and alkyl groups, preferably having from 1 to 7 carbon atoms per alkyl group, the total number of carbon atoms in all of the R' groups in each recurring unit being an integer of from 0 to about 12, preferably being an integer of from 0 to about 2, and X is selected from $RSO_4$, R being defined as before chlorine and bromine, and (II)

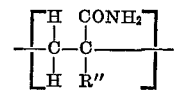

wherein R'' is hydrogen or methyl; and wherein said quaternized copolymer exhibits an inherent viscosity of about 0.5 to about 12, preferably about 2 to about 8, when measured at 30° C. in a 0.2 molar aqueous sodium chloride solution at a polymer concentration of 0.01 gram per 100 milliliters solution.

The normally solid, high molecular weight unmodified quaternary salts of vinylpyridine/acrylamide copolymers, containing recurring units identified by the Formulas I and II hereinbefore, are readily prepared by processes well known in the art. Such processes include copolymerization of acrylamide or methacrylamide with an adduct of a vinylpyridine and either a dialkyl sulfate, an alkyl chloride, or an alkyl bromide, the copolymerization being conducted in a suitable solvent in the presence of a suitable catalyst substantially in the absence of air. For example, an aqueous solution of acrylamide, or methacrylamide, and an alkylvinylpyridinium salt, i.e., an adduct of a vinylpyridine and a dialkyl sulfate or an alkyl chloride or bromide, containing a radical-generating catalyst, preferably a water soluble, organic or inorganic peroxide, e.g., potassium persulfate ($K_2S_2O_8$), is maintained in an inert atmosphere at a temperature within the range of about 0 to about 100° C., preferably about 20 to about 80° C., for a time within the range of about 10 minutes to about 5 days, preferably about 30 minutes to about 2 days. Although the resulting quaternized copolymer can be separated from the solution, e.g., by distillation of the water or by precipitation by dilution with a substance such as acetone, the aqueous solution of the quaternized copolymer can be employed directly without isolation of the polymer.

The quaternized vinylpyridine monomer should constitute from about 1 to about 50 weight percent, preferably about 3 to about 30 weight percent, of the monomers used in the preparation of the copolymer, i.e., of the quaternized vinylpyridine monomer plus the acrylamide or methacrylamide monomer.

If desired, the unmodified quaternized copolymer can be prepared by first copolymerizing the non-quaternized vinylpyridine monomer with acrylamide or methacrylamide by procedures well known in the art, followed by quaternization of the resulting polymer with a dialkyl sulfate or an alkyl chloride or bromide. For example, a mixture of the non-quaternized copolymer and the quaternizing agent can be maintained at a temperature of about 50 to about 250° C. for a time within the range of about 5 minutes to about 72 hours. The resulting quaternized copolymers can be employed directly without purification.

Modified quaternized copolymers of vinylpyridines and acrylamide or methacrylamide, are produced by reacting the unmodified quaternized copolymers described above with an aldehyde having the formula R'''CHO, wherein R''' is hydrogen, a monovalent saturated hydrocarbyl radical, or a monovalent aromatic radical. If desired, mixtures of aldehydes can be used. The aldehydes employed should contain from 1 to about 7 carbon atoms, preferably 1 to 3 carbon atoms. Formaldehyde is the presently preferred aldehyde. Examples of other aldehydes which can be used include acetaldehyde, propionaldehyde, butyraldehyde, isobutyraldehyde, isovaleraldehyde, hexanal, heptanal, cyclohexanecarboxaldehyde, 3-methylcyclopentanecarboxaldehyde, benzaldehyde, and the like, and admixtures thereof.

In the preparation of the modified quaternized copolymer, the aldehyde should be employed in an amount of about 0.01 to about 20 weight percent, preferably about 2 to about 7 weight percent, based on the amount of unmodified quaternized copolymer used. Although the reaction temperature can vary within a considerable range, the temperature generally will be within the range of about 10 °C. to about 100° C., preferably about 20° C. to about 80° C. The reaction time can vary widely, depending in part on the reaction temperature, but generally will be within the range of about 10 minutes to about 5 days, preferably about 1 hour to about 30 hours. Although the reaction is conveniently conducted at atmospheric pressure, higher or lower pressures can be employed. The reaction is conducted in an aqueous solution, preferably essentially water, in which the unmodified as well as the modified quaternized copolymer is soluble. Although the modified quaternized copolymer can be isolated, e.g., by distillation of water or by precipitation by dilution with a substance such as acetone, it is convenient to employ the aqueous solution directly, without isolation of polymer, in the treatment of aromatic carboxylic acids.

The amount of unmodified and/or modified quaternized vinylpyridine/acrylamide copolymer employed as a means of promoting separation of water insoluble impurities, e.g. metal catalysts or organic impurities, can vary from about 10 to as much as 1,000 parts per million by weight based on the total solid matter contained in an aqueous media, including the weight of alkali metal salt of aromatic carboxylic acid, e.g. terephthalic acid. Amounts varying from 50 parts per million to about 200 parts per million are preferred since particularly good filtration rates, both gravimetric and vacuum, are obtained when said quantities are employed in the practice of this invention.

The term reaction product comprising alkali metal salts of aromatic carboxylic acids as employed herein is intended to describe or include any aromatic carboxylic acid reaction product produced by any process that contains any amount of any water insoluble substance such as metal catalysts suitably employed in the particular process. The use of quaternary salts of vinylpyridine polymers in the separation of heavy metal catalysts and/or compounds, which in general have proved to be suitable catalysts for the preparation of aromatic carboxylic acids, particularly from reaction products comprising alkali metal salts of terephthalic acid is a preferred embodiment of this invention. Metals frequently referred to by the art as suitable terephthalic acid process catalysts include zinc, cadmium, mercury, iron, lead, manganese and cesium, and their compounds such as their oxides, inorganic or organic acid salts, complexes and metal organic compounds. Said catalysts are added to the starting materials to produce the desired catalytic effect and may vary within rather wide limits, namely from 0.1 to 15 percent by weight, but preferably from 0.5 to 5 percent by weight based on the weight of starting aromatic carboxylic acid salt.

Generally, such catalysts are provided in a finely-divided state and are uniformly distributed throughout the starting materials as well as the reaction products. The catalysts can be employed alone or in conjunction with well known catalyst carrier substances, such as kieselguhr. In addition to the catalyst or catalyst carrier, reaction products comprising alkali metal salts of aromatic carboxylic acid mixtures may contain inert liquid or solid additives, such as metal powders, metal shavings, activated charcoal and salts such as potassium carbonate, sodium carbonate, or sodium sulfate. The inert materials are employed in many cases in order to improve the physical properties of the reaction mixture. In place of or in addition to inert solids, inert liquids may also be present provided such liquids do not decompose under the reaction conditions of the process. Suitable inert liquids, e.g. during the production of terephthalic acid, include diphenyl ether, diphenyl, benzene, naphthalene and the like.

In the unreacted form, starting materials for the preparation of alkali metal salts of aromatic carboxylic acids can be readily recovered from aqueous reaction media and may be reused as starting materials along with catalyst residue in either its purified or unpurified form, e.g. mixtures of catalyst and quaternary salts of vinylpyridine polymers. Separation of the water insoluble substances from the aqueous medium containing the alkali metal salts can be effectively carried out by filtration, decantation, centrifugation and/or other suitable means to obtain filtrate which is at least substantially free of such substances. Following separation of the water insoluble substances from alkali metal salts of carboxylic acids, the free acid or the alkali metal salt in its purified form thereafter can be separated from the aqueous solutions by acidification thereof or by extraction with a solvent in accordance with any of the methods well known to the art.

The following examples are set forth to illustrate the best mode of practicing the invention and are not intended to be unduly limitative.

EXAMPLE I

In the preparation of dipotassium terephthalate, reactor product was obtained by first mixing 466 gms. potassium benzoate, 29.1 gms. $CdCO_3$ and 14.5 gms. KOCN with a ball mill. The mixture was placed in a 2 inch by 2½ feet stainless steel pipe arranged for heating with flue gas. The mixture was heated at 430° C. for one hour while passing carbon dioxide through it. Product solids (391 gms.) were recovered and found to contain 51 gms. of potassium benzoate and 216 gms. dipotassium terephthalate, as well as water-insoluble catalyst and carbonaceous material.

5.0 gm. aliquots of the above product solids were placed in a 100 ml. beaker along with 40 mls. of distilled water and about 0.0006 gm. of specified test polymer, e.g. a vinylpyridine polymer. The mixture was stirred at room temperature for about 5 minutes and then filtered through either a 4.25 cm. Whatman No. 1 filter using a partial vacuum (about 480 mm. Hg pressure differential), or through a No. 588 15 cm. fluted filter using gravity filtration. Times for the filtrations were measured. Control tests were conducted in which no test polymer was employed.

In additional test, 5.0 gm. aliquots of the above product solids were placed in a 100 ml. graduated cylinder along with 0.0006 gm. of the specified test polymer in 100 mls. of water. The system was mixed by rotating the cylinder and the settling time required was measured. A control test was carried out in which no test polymer was used. A summary of the results follows:

TABLE I

| Test polymer | Gravity filtration, min. | Vacuum filtration, min. | Settling time, min. |
|---|---|---|---|
| Vinylpyridine polymer [1] | 4 | 13 | 4 |
| Do.[2] | 4 | 3.5 | 4 |
| Commercial polymer [3] | 3.5 | 4.5 | 5 |
| Do.[4] | 20 | 21 | [5] |
| None (control) | 27 | 18 | [5] |

[1] 1,2-dimethyl-5-vinylpyridinium methyl sulfate/acrylamide copolymer, inherent viscosity 2.57 when measured at 30° C. in a 0.2 molar aqueous sodium chloride solution at a polymer concentration of 0.01 gm. per 100 ml. solution, prepared by shaking at 50° C. for 24 hours a mixture of 10 gm. of 1,2-dimethyl-5-vinylpyridinium methyl sulfate, 90 gm. of acrylamide, 0.10 gm. of potassium persulfate, and 400 gm. of water which previously had been boiled and cooled.
[2] 1,2-dimethyl-5-vinylpyridinium methyl sulfate/acrylamide copolymer, inherent viscosity 5.19 when measured at 30° C. in a 0.2 molar aqueous sodium chloride solution at a polymer concentration of 0.01 gm. per 100 ml. solution, prepared by shaking at 50° C. for 24 hours a mixture of 5 gm. of 1,2-dimethyl-5-vinylpyridinium methyl sulfate, 45 gm. of acrylamide, 0.0125 gm. of potassium persulfate, and 200 gm. of water which previously had been boiled and cooled.
[3] Polyfloc 1150, Betz Laboratories, Inc., reportedly a cationic acrylamide copolymer.
[4] Polyfloc 1100, Betz Laboratories, Inc., reportedly an anionic acrylamide copolymer.
[5] 8 hours.

As shown by the foregoing examples in Table I separation of insoluble metal catalysts from alkali metal salts of terephthalic acid are significantly improved by admixing the reaction products with a quaternary salt of a vinylpyridine/acrylamide copolymer.

Further application of the teachings of this invention in the treatment of various reaction products containing alkali metal salts of aromatic carboxylic acids will be apparent to those skilled in the art.

That which is claimed is:

1. A method of promoting the separation of water insoluble substances from an aqueous medium containing said substances and an alkali metal salt of an aromatic carboxylic acid which comprises contacting said aqueous medium with a cationic acrylamide copolymer.

2. A method in accord with claim 1, wherein said copolymer contains recurring units represented by the following Formula I:

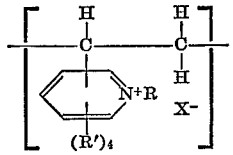

wherein each unit R independently represents the same or a different alkyl group, each unit R' independently is selected from hydrogen and alkyl groups, and each unit X is selected from $RSO_4$, R being defined as before, chlorine and bromine; and Formula II:

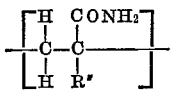

wherein R'' is hydrogen or a methyl group.

3. A method in accord with claim 2, wherein said water insoluble substances are selected from the class consisting of insoluble metal catalysts, insoluble carbonaceous substances, and mixtures thereof, and wherein the copolymer recurring units consist essentially of said Formula I units and said Formula II units.

4. A method in accord with claim 3, wherein said copolymer has an inherent viscosity of about 0.5 to about 12, when measured at 30° C. in a 0.2 molar aqueous sodium chloride solution at a polymer concentration of 0.01 gram per 100 milliliters solution.

5. A method in accord with claim 4, wherein said aqueous medium contains substantial quantities of an alkali metal salt of terephthalic acid.

6. A method in accord with claim 5, wherein said copolymer is a 1,2-dimethyl-5-vinylpyridinium methyl sulfate/acrylamide copolymer.

7. A method in accord with claim 6, wherein said copolymer is employed in amounts of at least 10 parts per million by weight of the total solid matter contained in the aqueous medium.

8. A method in accord with claim 7 further comprising filtering the thus treated aqueous medium to obtain a filtrate which is at least substantially free of said substances.

9. A method in accord with claim 5 wherein said aqueous medium is prepared by heating an alkali metal salt of aromatic monocarboxylic or dicarboxylic acid other than terephthalic acid in a substantially oxygen-free inert atmosphere and in the presence of a suitable metal catalyst, thus forming a reaction product comprising said alkali metal salt of terephthalic acid and water insoluble substances; admixing the thus formed reaction product with water, thus forming an aqueous medium containing the formed reaction product, and wherein said cationic acrylamide copolymer consists essentially of the recurring units represented by the following Formula I:

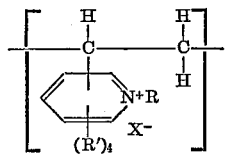

wherein each unit R independently represents the same or a different alkyl group having 1 to 4 carbon atoms, each unit R' independently is selected from hydrogen and alkyl groups having from 1 to 7 carbon atoms, and each unit X is selected from $RSO_4$, R being defined as before, chlorine and bromine; and Formula II):

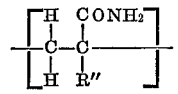

wherein R'' is hydrogen or a methyl group; said copolymer having an inherent viscosity of about 0.5 to about 12 when measured at 30° C. in a 0.2 molar aqueous sodium chloride solution at a polymer concentration of 0.01 gram per 100 milliliters of solution; and further comprising separating the water insoluble substances from the aqueous medium, acidifying the aqueous medium from which said water insoluble substances have been separated, and recovering terephthalic acid as a product.

10. A process in accord with claim 9, wherein the alkali metal salt of terephthalic acid is dipotassium terephthalate, said metal catalyst comprises a mixture of $CdCO_3$ and KOCN, and said heating is carried out in the presence of carbon dioxide at an elevated temperature of about 430° C. for a period of time of about 1 hours.

References Cited

FOREIGN PATENTS 1,627   1/1963   Japan _____ 260—525

LORRAINE A. WEINBERGER, Primary Examiner

P. J. KILLOS, Assistant Examiner

U.S. Cl. X.R.

260—67.6, 79.3, 88.3R, 515 P